2,793,057
Patented May 21, 1957

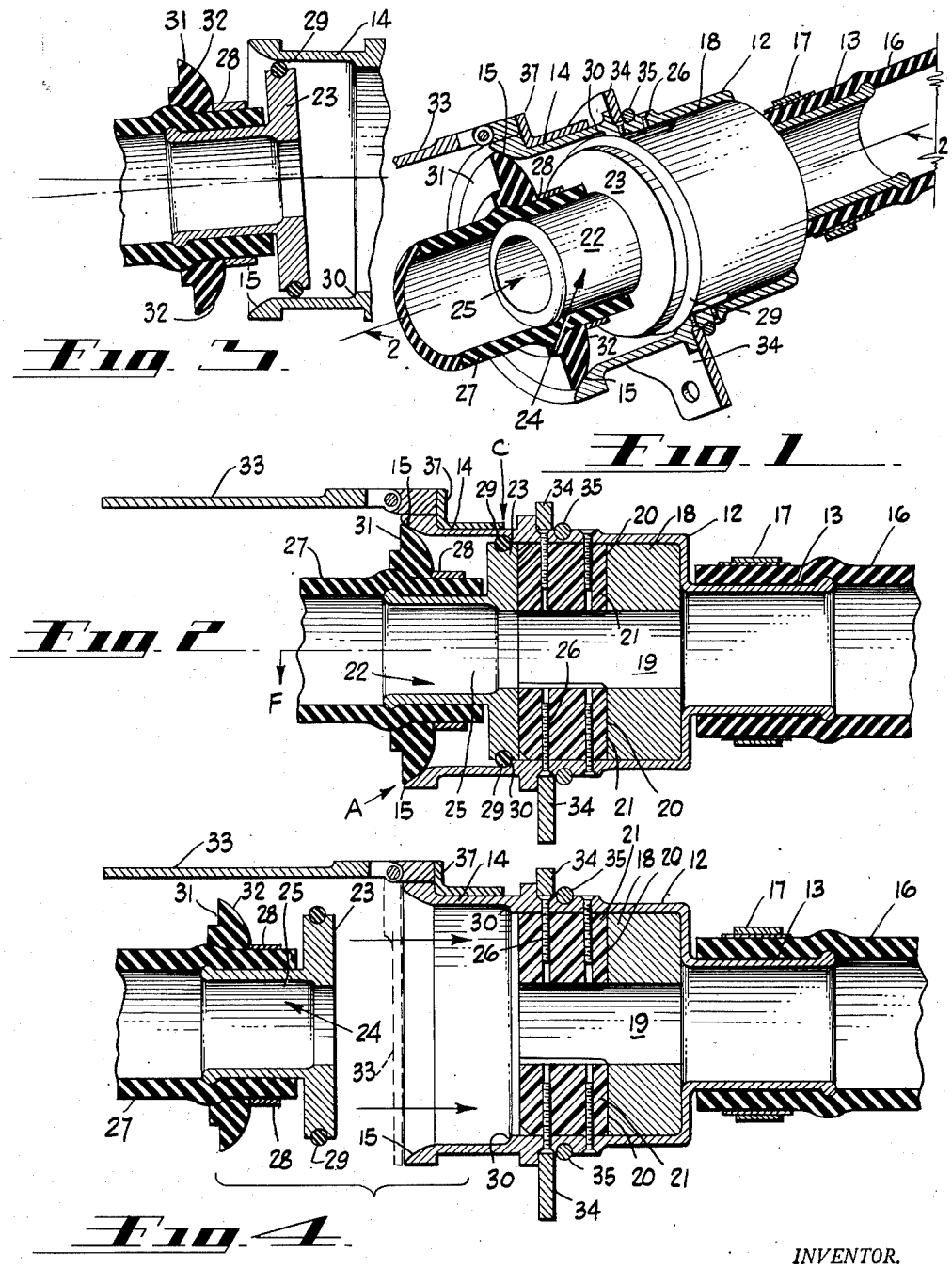

United States Patent Office

2,793,057

MAGNETIC HOSE COUPLING

Harry L. McGugin, Pacific Palisades, Calif., assignor to Douglas Aircraft Company, Inc., Santa Monica, Calif.

Application June 25, 1953, Serial No. 363,975

10 Claims. (Cl. 285—9)

This invention relates to an improved fluid coupling, and more particularly to a coupling device for use in airplane oxygen systems.

With the advent of high speed, high altitude airplanes, it has become increasingly important to provide a positive supply of oxygen in a system that is safe and easy to operate. Particularly in military airplanes, it is imperative that the crew members be free to concentrate their efforts on their primary activities and be free from the necessity of repeatedly checking the oxygen hose connections. It is also desirable that oxygen hose couplings in civil airplanes be simple and positive because it is not feasible to instruct casual passengers in the use of any other type.

Existing oxygen hose couplings are seriously deficient in that, (1) the user must be careful to see that the mask connector is properly aligned with the supply connector; (2) the coupling formed by the joining of the connectors tends to become disconnected when a small load, particularly a non-axial load, is imposed upon it; and (3) disconnections occur without awareness thereof by the user. Several serious accidents have occurred because oxygen hoses were improperly coupled initially, or were inadvertently uncoupled, causing the user to suffer from anoxia, with its consequent disabilities. As operational altitudes are increased more and more, it is obvious that even a few seconds interruption of the oxygen supply, through inadvertent and undetected disconnection, can be fatal.

The present invention provides simple and positive means for making the connection; it is structurally arranged to provide that disconnection will not occur by virtue of transverse loadings; it has a built in "feel" which permits the user to know that his coupling is properly connected; and it has an inherent "reconnecting" means which causes re-engagement of the coupling when it has become inadvertently disconnected. In addition, it is so designed that it is easily and safely disconnected without attention from the user in case of a required emergency exit from the airplane.

The improved coupling comprises a body member adapted to be attached to an oxygen hose, and a complementary member or keeper, also adapted to be attached to an oxygen hose, which engages the body member and is held in connecting relationship therewith by a permanent magnet located in the body member. A supporting member disposed around the complementary member, and arranged to engage the body member, prevents the coupling from being disconnected by transverse forces. A hinged cover on the body member, which is closed whenever the complementary member is withdrawn, prevents contamination of the body member, and its attendant oxygen supply, by foreign matter.

To initially connect the mask to a supply line, the user need only insert the complementary member or keeper in the receiving end of the body member for a very short distance. At this point the magnetic attraction of the magnet in the body member is sufficiently strong so that the keeper is seized, drawn against the face of the magnet, and held thereagainst in connecting relationship. When the keeper is in facewise contact with the magnet, the support member bears against the periphery of the receiving portion of the body member in such a manner as to prevent transverse forces from separating the coupling.

Should the keeper become separated from the magnet face a short distance, the magnet will re-engage the keeper whenever the force tending to separate the parts is relaxed. In existing couplings, if a force separates the coupling any distance, no matter how small, the connection will not re-form without attention from the user.

The presently preferred form of this invention is illustrated in the accompanying drawing in which:

Figure 1 is a perspective view of the coupling with some of the elements shown in partial section;

Figure 2 is a sectional view of the coupling along line 2—2 of Figure 1;

Figure 3 is a sectional view of the coupling similar to Figure 2 but with the complementary member shown in a partially withdrawn position; and Figure 4 is a sectional view of the coupling similar to Figure 2 but with the complementary member shown fully withdrawn.

As illustrated in Figure 2, the coupling comprises a hollow, generally cylindrical body member 12, having a cylindrical, tubular extension 13 at one end thereof, and a receiving portion 14 with a beveled edge 15 at the other end. To extension 13 may be fastened a typical flexible conduit or hose 16 such as is commonly used in oxygen systems, conduit 16 being held in place on the extension by any suitable, adjustable type conduit clamp 17. Disposed within the central portion of body member 12 is a cylindrical, permanent magnet 18 having a suitable flux density for the particular purpose at hand. Magnet 18 has a passageway 19 centrally located therein, the passageway aligned with the tubular extension 13 so as to provide a continuous fluid path from conduit 16 to receiving portion 14 of body member 12. The magnet is provided with a pair of diametrically opposed slots 20, adapted to receive non-magnetic blocks, of a material such as Micarta, to retain the magnet in position in the fitting, and to provide the proper polarity and fluxline paths for the magnet. The blocks in turn are retained in their locking position by screws 26. The removable screws permit easy interchange of magnets should varying strength requirements demand it.

A complementary member or keeper 22, preferably of soft iron, having an enlarged flange 23 at one end and a cylindrical, tubular conduit receiving extension 24 at the other is disposed in facewise contact with magnet 18 and magnetically retained thereagainst. A passageway 25 in the keeper is aligned with the passageway formed in the magnet 18 and conduit receiving extension 13 in order to provide a continuous fluid path through the entire coupling. Another flexible conduit 27 is attached to the keeper and retained thereon by a suitable, standard conduit clamp 28. Around the periphery of flange 23 is disposed an O type sealing ring 29, the ring being adapted to fit in sealing relation against shoulder 30 of body member 12, thereby preventing leakage of the fluid seeping along the faces of the magnet 18 and the complementary member 22. An annular shaped, rubber support member 31 having a camming surface 32 is fitted around the complementary member 22, and engages bevel 15 of the body member in peripheral contact, thereby preventing a transverse force from breaking the connection.

In the oxygen coupling embodiment of the invention, a hinged spring-biased cover 33 is attached by bracket 37 to the body member 12 and closes, as indicated in Figure 3, when the complementary member is withdrawn, thereby preventing any contamination of the oxygen supply. Also attached to body member 12 is a holder 34 to which may be attached a clothes clip (not shown) for clipping the supply conduit 16 to the user's clothing, in accordance with usual practice. The holder is retained in position by a split ring 35.

When the coupling is used as an oxygen connector, the complementary member or keeper 22 is attached to an oxygen mask hose, and the body member 12 is attached to a hose leading to the airplane's oxygen supply. To utilize the oxygen supply, the mask wearer merely raises cover 33 and inserts complementary member 22 a short distance into receiving portion 14 of body member 12, at which point the magnetic forces of magnet 18 seize the complementary member 22 and draw it snugly into facewise contact with the magnet. The wearer is not troubled with insuring that a split ring connection is properly seated, or that the coupling is "cocked" in some manner; the magnetic seizing and holding feature positively insures that a proper connection has been made.

During the period the mask wearer is coupled to his oxygen supply, his head and body movements will cause forces to be imposed upon the coupling, the forces tending to sever the connection. A pure axial force of sufficient strength to overcome the magnetic force, for example, will disengage keeper 22 from facewise contact with magnet 18 and begin to move the keeper away therefrom and to the left (as shown in Figure 2) in receiver 14. As long as the keeper 22 is anywhere within the receiving portion 14 of the body member, relaxation of the axial force will result in the magnetic forces again seizing the keeper and drawing it against the magnet face, thereby "re-sealing" the connection. Almost no loss of oxygen occurs even when the keeper is displaced from the magnet face because sealing ring 29 prevents any fluid from moving around the edges of the keeper. This "re-sealing" or "re-connecting" feature of the invention is extremely important and it is a vast improvement over the present connectors which, once the connection has been broken, will not reconnect, under any circumstances, despite relaxation of the axial force.

If a transverse or side force is applied to the coupling, support member 31, in cooperation with the flange and sealing ring of the complementary member or keeper, prevents any displacement of the keeper from the magnet face. For example, a force F, applied as indicated in Figure 2, would tend to rotate the keeper 22 about point A, the point of contact between the camming surface 32 of support 31 and bevel 15. It will be observed, however, that rotation cannot occur, because point C, the point on sealing ring 29 normally in contact with the body member 12, is restrained from moving upward by the body member, and point C can only move in a direction parallel to the longitudinal axis of the couplings. Since there is no axial force present to cause longitudinal movement, no motion of any kind can occur, and the connection cannot be broken.

If a combination of transverse and axial forces is applied, the coupling will still satisfactorily operate, and, upon relaxation of the forces, will "re-seal," as long as the flange 23 is not completely withdrawn from the receiving portion 14 of the body member. For example, if, under combined loading, the coupling should assume a position as shown in Figure 3, the most extreme position it is possible for it to assume and still remain in the receiving portion of the body member, relaxation of the loads will permit the force of the magnet to seize and draw the flange 23 toward its face, and re-engage it in facewise contact, the support member 31 being forced into proper alignment by the coaction of beveled edge 15 and the "camming" surface 32.

Another particularly advantageous feature of the magnetic coupling is that the mask wearer is able to "feel" and "hear" the engagement of the keeper and the magnet, and thereby has positive assurance that the connection is complete. A distinctly audible "click" results when the keeper and magnet engage in facewise contact, and the usual "pulling" sensation is experienced. In the existing couplings, the only means by which to determine if the coupling is properly connected is to pull on the mask hose, which procedure frequently results in the connection being broken. This invention gives definite assurance to the user that the connection is complete, and obviates the necessity for the "tugging" test.

While the presently preferred form of the invention has been illustrated and described herein, it will be appreciated that various changes may be made in the construction and arrangement of the parts without departing from the spirit of the invention, and it is intended that all such changes shall be embraced within the scope of the following claims.

I claim:

1. A fluid coupling comprising: a body member adapted to be attached to the end portion of a hose, said body member having a hollow receiver portion at the free end thereof; magnetic means disposed in said body member, said magnetic means having a passageway adapted to communicate with the end portion of an attached hose whereby to permit the transmission of fluids therethrough; a complementary member having hose receiving means at one end thereof, said complementary member being in flat facewise contact with said magnetic means and adapted to be magnetically retained thereagainst, and said complementary member having a passageway therethrough adapted to communicate with the end portion of an attached hose, said passageway being in substantially axial alignment with the passageway in said body member; and support means attached to said complementary member, said support means being engaged in peripheral contact with the aforesaid receiver portion of said body member whereby to resist transverse forces tending to break the connection.

2. A fluid coupling comprising: a body member with a passageway therethrough, said body member having a hollow receiver portion at the free end thereof; means on said body member to connect it in operative relationship with one portion of a fluid transmission line; a complementary member having a passageway therethrough, said passageway being disposed in communicating relationship to the passageway in said body member, whereby to permit the transmission of fluids through said coupling; means on said complementary member to connect it in operative relationship with another portion of a fluid transmission line; permanent magnet means for seizing and holding said body member and said complementary member in flat facewise connecting relationship, said magnet means being adapted to reconnect said body member and said complementary member when said members are displaced from each other within predetermined limits; and support means attached to said complementary member, said support means being engaged in peripheral contact with the aforesaid receiver portion of said body member whereby to resist transverse forces tending to break the connection.

3. A fluid coupling comprising: a body member with a passageway therethrough, said body member having a hollow receiver portion at the free end thereof; means on said body member to connect it in operative relationship with one portion of a fluid transmission line; a complementary member having a passageway therethrough, said passageway being disposed in communicating relationship to the passageway in said body member whereby to permit the transmission of fluids through said coupling; a sealing member disposed peripherally on said complementary member, said sealing member being adapted to engage in sealing relationship with the aforesaid receiver portion of said body member whereby to minimize fluid leakage; means on said complementary member to connect it in operative relationship with another portion of a fluid transmission line; permanent magnet means for seizing and holding said body member and said complementary member in flat facewise connecting relationship, said magnet means being adapted to reconnect said body member and said complementary member when said members are displaced from each other within predetermined limits; and support means attached to said complementary member, said support means being engaged in peripheral contact with the aforesaid receiver portion of said body member whereby to resist transverse loads tending to break the connection; said support means and said sealing member combining to form a couple in said receiver portion to prevent rocking of said complementary member in said receiver portion.

4. A fluid coupling comprising: a hollow, cylindrical body member with a passageway therethrough, said body member having a hollow receiver portion at the free end thereof; a cylindrical, tubular extension at the opposite end of said body member and in communicating relationship therewith, said extension being adapted to be attached to a flexible fluid conduit; a cylindrical permanent magnet disposed in said body member and fastened thereto, said magnet having a passageway therethrough arranged in communicating relationship with the passageway in said body member; a hollow, tubular complementary member having an enlarged flange at one end thereof, said flange being disposed in flat facewise contact with said magnet in said body member and adapted to be magnetically retained thereagainst; a passageway in said complementary member, said passageway being in substantially axial alignment with the passageway in said magnet in said body member; a cylindrical, tubular extension at the end of said complementary member opposite the flanged end, said extension being adapted to receive a flexible fluid conduit thereon; and an annular, yielding supporting member disposed around said tubular complementary member, said supporting member being engaged in peripheral contact with the aforesaid receiver portion of said body member whereby to resist the transverse forces tending to break the coupling.

5. A complementary fluid coupling member comprising: a cylindrical tubular member having hose receiving means at one end thereof; an enlarged flange portion at the other end thereof, said flange portion being adapted to be seized and held in flat facewise connecting relationship by a mating magnetic coupling member having a tubular extension; and support means disposed around said tubular member, said support means being adapted to engage said tubular extension in peripheral contact whereby to resist the action of transverse forces tending to separate said joined flange portion and said magnetic coupling member.

6. A complementary fluid coupling member comprising: a cylindrical tubular member having hose receiving means at one end thereof; an enlarged flange portion at the other end thereof; said flange portion adapted to be seized and held in flat facewise connecting relationship by a magnetic coupling member; support means disposed around said tubular member; and sealing means disposed around said tubular member and axially spaced from said support means; said support means and said sealing means being in peripheral contact with a tubular extension of said magnetic coupling member to form a couple in said extension to prevent rocking of said cylindrical tubular member in said extension.

7. A fluid coupling member comprising: a hollow body member with a passageway therethrough, said member having a hollow portion at one end thereof to receive a complementary coupling member and being adapted at the other end for connection with a fluid conduit; and a magnetic retaining unit disposed in said body member, said unit comprising a generally cylindrical block of magnetic material having a passage therethrough in continuation of the passageway in said body member, a portion of said block being divided into a pair of magnetic pole members extending axially to engage in flat facewise contact with said complementary coupling member to close a magnetic path therethrough and produce a maximum magnetic retaining effect.

8. A fluid coupling comprising: a hollow body member having an axial passageway therethrough for transmission of fluid; means at one end of said body member for connection to a fluid conduit; means at the other end of said body member for slidably receiving a complementary coupling member, said means comprising a cylindrical extension; magnetic retaining means in said body member for drawing said complementary member into flat facewise sealing engagement therewith; said complementary coupling member having an axial passageway therethrough in continuation of the first said axial passageway, and having means at one end for connection to a second conduit and means at the other end for sealing engagement with the body member; said last named means comprising a flat, laterally extending portion for flat facewise engagement with the magnetic retaining means, the periphery of said portion bearing a sealing member for engagement with said body member and for sliding and sealing engagement with the inner wall of said cylindrical extension; whereby the coupling is substantially sealed not only when the members are in full engagement but also when said complementary member is partially disengaged with said laterally extending portion in an intermediate position in said cylindrical extension.

9. A fluid coupling member comprising: a hollow body member with a passage therethrough, said member having a hollow portion at one end thereof to receive a complementary coupling member and being adapted at the other end for connection with a fluid conduit; a magnetic retaining unit disposed in said body member, said unit comprising a generally cylindrical block of magnetic material having a passageway therethrough in continuation of the passageway in said body member, a portion of said magnetic block being provided with a plurality of diametrically opposed slots; and readily removable non-magnetic blocks filling said slots and fastened to said body member to retain said magnetic block in said body member.

10. A fluid coupling comprising: a body member with a passageway therethrough, said body member having a hollow receiver portion at the free end thereof; means on said body member to connect it in operative relationship with one portion of a fluid transmission line; a complementary member having a passageway therethrough said passageway being disposed in communicating relationship to the passageway in said body member whereby to permit the transmission of fluids through said coupling; means on said complementary member to connect it in operative relationship with another portion of said fluid transmission line; permanent magnet means for seizing and holding said body member and said complementary member in flat facewise connecting relationship; said magnet means being adapted to reconnect said body member and said complementary member when said members are displaced from each other within predetermined limits; and said complementary coupling and said magnet adapted so that when said complementary member is placed in said hollow receiver portion said magnet seizes and pulls said complementary member toward said magnet so as to engage said magnet and said complementary member in said flat facewise contact, an audible signal being produced at the time of contact to assure the user that the coupling is properly sealed.

References Cited in the file of this patent

UNITED STATES PATENTS 553,509    Burnham _____ Jan. 28, 1896

(References on following page)

UNITED STATES PATENTS

| | | |
|---|---|---|
| 1,077,417 | McCracken | Nov. 4, 1913 |
| 1,294,913 | Johnson | Feb. 18, 1919 |
| 1,989,527 | Powers | Jan. 29, 1935 |
| 2,147,482 | Butler | Feb. 14, 1939 |
| 2,149,119 | Funke | Feb. 28, 1939 |
| 2,364,447 | Hynes | Dec. 5, 1944 |
| 2,475,573 | Smith et al. | July 5, 1949 |
| 2,477,533 | Whiting | July 26, 1949 |
| 2,521,127 | Price | Sept. 5, 1950 |
| 2,523,770 | Marette | Sept. 26, 1950 |
| 2,678,228 | Gerhardt | May 11, 1954 |